UNITED STATES PATENT OFFICE.

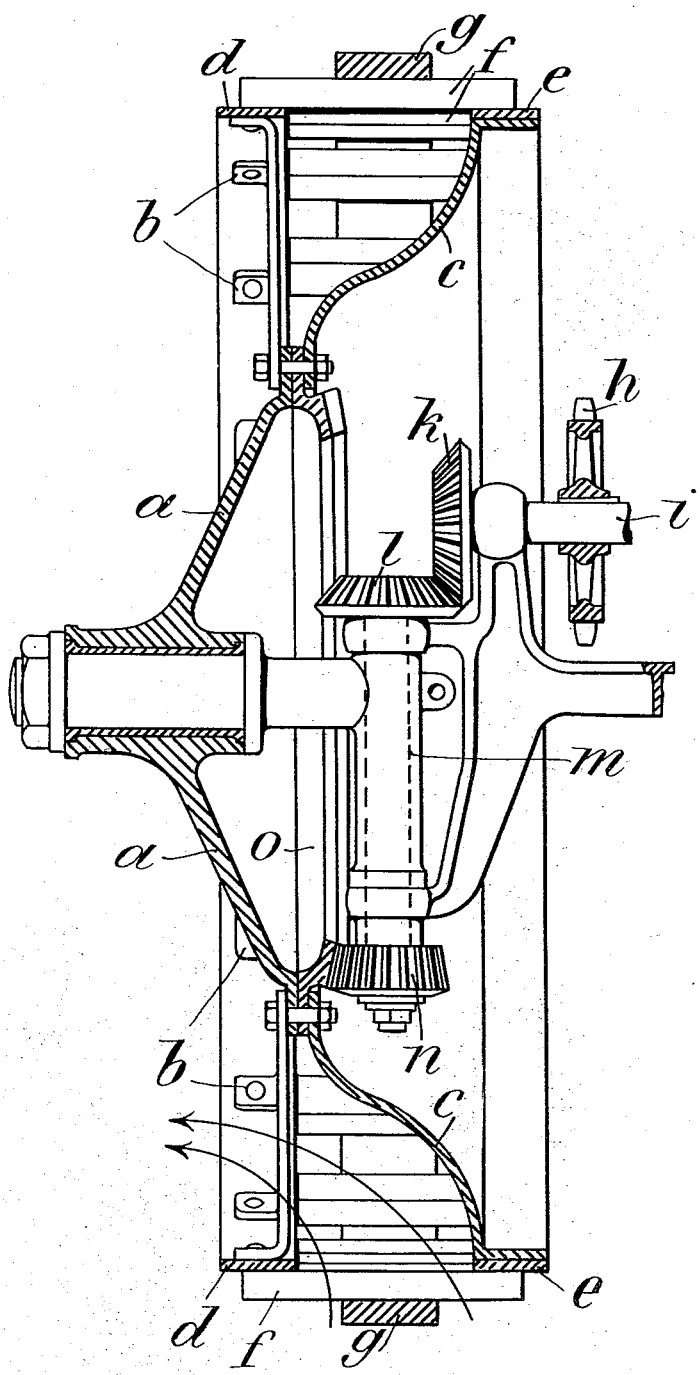

JOSEPH BREY, OF COLOGNE, GERMANY.

DRIVING-WHEEL FOR TRACTION-ENGINES.

1,005,505.  Specification of Letters Patent.  Patented Oct. 10, 1911.

Application filed November 12, 1909. Serial No. 527,736.

*To all whom it may concern:*

Be it known that I, JOSEPH BREY, subject of the King of Wurttemberg, residing at Cologne-on-the-Rhine, Germany, have invented certain new and useful Improvements in Driving-Wheels for Traction-Engines; and I do hereby declare the following to be a full, clear, and exact description of the invention, such as will enable others skilled in the art to which it appertains to make and use the same.

The present invention relates to a driving-wheel for traction-engines, and more especially traction-engines for drawing plows or the like heavy weights over soft ground.

This invention allows the wheel to get a firm grip of the ground and prevents slipping or skidding and at the same time avoids the disadvantage common to all former wheels of this kind, namely, that the recesses between the ridges arranged on the circumference of the wheel soon become clogged with soil, thus preventing the entrance of said ridges into the ground. In the present invention such clogging is obviated by the cross-pieces or ridges on the circumference of the wheel being arranged with a wide intervening space, and by the arrangement of guiding surfaces for the soil entering between said cross-pieces, which surfaces cause the soil to be pressed laterally out of the wheel, thus making room for new soil to enter.

Reference being had to the accompanying drawing which shows a wheel according to the present invention in section, $a$ represents the bell-shaped body of the wheel carrying the spokes $b$ and another bell-shaped part $c$, the latter presenting in cross section a substantial ogee curve, which form is particularly adapted to enable the part $c$ to perform its function of deflector for the soil which enters between the cross pieces $f$ (hereinafter referred to) when the wheel is in operation. The ends of the spokes $b$ and the part $c$ each carry a ring of band-iron $d$ and $e$, which latter are connected at suitable intervals by cross-pieces $f$. On these cross-pieces $f$ a band or ring $g$ is further arranged, serving as a tire for motion on hard roads. When moving over soft ground on the other hand, the rings $d$, $e$ and $g$ with the cross-pieces $f$ will be pressed to a greater or lesser depth into the soil. The earth, mud, or clay which enters between these parts will be pressed along the surface $c$ and be passed out of the wheel in the manner shown by the arrows in the figure, thus making a clogging of the recesses of the circumference impossible.

Instead of the one tire-ring $g$ two such may be arranged above the bands $d$ and $e$. It is not absolutely necessary that the tire $g$ protrude over the cross-pieces $f$, but both the cross-pieces and the road are subjected to less wear and tear by this arrangement. For use on very dry soil it will be advantageous to remove the tire $g$ altogether thus giving the wheel a greater power of adhesion. To facilitate this the rim $g$ may be made removable.

Motion is imparted to the wheel from the shaft $i$ and chain-wheel $h$ through the conical gear $k$, $l$ and vertical axis $m$, around which latter the wheel can turn, and finally through the conical gear $n$, $o$ to the toothed inner rim of the wheel.

The foregoing description and accompanying drawing refer to a front steering wheel; in the case of a back wheel not required for steering, the above-described gearing will naturally be simpler in construction.

Especial attention is directed to the fact that in the structure above described the tread or traction portion of the wheel is of skeleton or open construction, consisting of the spaced rings $d$ and $e$ and the transverse cross pieces $f$, and this arrangement of parts conduces to a satisfactory operation in that the soil which is enabled to freely enter between the cross pieces, is deflected to a point outside the wheel by the ogee deflector $c$.

What I claim as my invention and desire to secure by Letters Patent, is:

In a traction wheel of the character specified, the combination with the wheel spokes, of a band iron secured thereto, a substantially ogee shaped deflector secured to said spokes and having one edge thereof curved away therefrom, a second band iron secured to said deflector and lying in the same plane as but spaced away from said first mentioned band iron, cross pieces arranged at intervals across the peripheries of said band irons and permitting soil to pass freely between said pieces and against the deflector whereby soil is directed upwardly beyond the level of the earth and outwardly from the wheel, and a ring $g$, extending across and around said cross pieces.

In testimony whereof I hereunto affix my signature in the presence of two witnesses.

JOSEPH BREY.

Witnesses:
 FRANZ HALM,
 PETER SCHULLER.